Patented Nov. 15, 1927.

1,649,667

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

ALKYL RESORCINOL.

No Drawing.    Application filed April 29, 1925.   Serial No. 26,813.

This invention relates to new higher alkyl resorcinols containing more than four carbon atoms in the alkyl groups. More particularly, the invention comprises higher alkyl resorcinols containing not less than five and not more than seven carbon atoms in the alkyl groups.

The invention includes the compounds in a pure state as well as in a partially purified state.

The new alkyl resorcinols may be prepared by the reduction of the corresponding acyl resorcinols with a reducing agent, such as, for example, zinc amalgam and hydrochloric acid, followed by purification by redistillation in vacuo, recrystallization from solvents, etc.

The new alkyl resorcinols may also be produced from resorcinol and the corresponding fatty acids by causing the acid and the resorcinol to react in the presence of the condensing agent, such as zinc chloride, at elevated temperatures, forming the intermediate ketone, that is, the acyl resorcinols, which are then purified and reduced to form the alkyl resorcinol, using a suitable reducing agent, such as, for example, zinc amalgam and hydrochloric acid.

The following specific examples, which relate to the production of normal amyl resorcinol, will illustrate methods of preparing the new alkyl resorcinols, but it will be understood that the invention is not limited to alkyl resorcinols prepared in this particular way.

Preparation of normal amyl resorcinol from normal amylyl resorcinol: 1 part of normal amylyl resorcinol is reduced by 2½ parts zinc amalgam in 5 parts of hydrochloric acid (20 Bé.) and 6 parts of water, with vigorous stirring at 105° C. The reduction is complete in 10 or 12 hours. The reduction product is washed with an equal volume of water and the water layer separated. The reduction product is then distilled in vacuo whereby the last traces of water are removed and finally the normal amyl resorcinol is distilled. The product is then redistilled, the distillate permitted to solidify into a solid and the solid is recrystallized from a mixture of toluene and petroleum ether, yielding white crystals which have a melting point of about 71.5° to 73° C. Normal amyl resorcinol has a boiling point of about 168° to 170° at 6 to 7 millimeters.

Normal amyl resorcinol may also be produced in a single process from resorcinol and normal valeric acid as follows: Twenty parts of anhydrous zinc chloride are dissolved in 100 parts of normal valeric acid, the solution being aided by heating and stirring. Thirty-three parts of resorcinol are gradually added over a period of about 20 minutes while the temperature is maintained near 135° C. and the reaction mixture is then stirred for a period of about 3 hours in a temperature of about 135° to 145° C. At the end of this time an equal volume of water is added and the mixture is further stirred. The oily reaction product rises to the surface, is separated from the aqueous layer, and washed with an equal volume of water and the water then separated from the washed product. The product is then distilled in vacuo; traces of water and the excess normal valeric acid being first distilled over and finally the normal amylyl resorcinol being distilled over. The distillate can then be subjected to reduction, without isolation of the pure amylyl resorcinol by treating it as above decsribed. The normal amylyl resorcinol may be further purified by redistillation and crystallization from a mixture of toluene and petroleum ether. After redistillation and crystallization the product is in the form of white crystals having a melting point of about 58.5° to 60° C.

The normal amylyl resorcinol has a boiling point of about 190° to 192° C. at 6 to 7 millimeters pressure.

The pure crystals of normal amylyl resorcinol may also be reduced as described above. It is not necessary, however, to isolate the normal amylyl resorcinol as a pure crystalline product, but the partially purified product, as distilled off from the reaction mixture, may be directly reduced, as described above.

In a similar manner other alkyl resorcinols, such as the hexyl and heptyl, resorcinols, may be produced either from the corresponding acyl resorcinols or directly in a single process from resorcinol and the corresponding fatty acid. Among the new alkyl resorcinols which can be thus obtained may be mentioned the following, the melting point and boiling point of the compounds in a purified state being given:

|  | Melting point | Boiling point 6-7 mm. |
|---|---|---|
| Amyl resorcinol | 71.5–73 | 168–170 |
| Iso-amyl resorcinol | 61–62.5 | 177–178 |
| Hexyl resorcinol |  | 178–179 |
| Iso-hexyl resorcinol | 70–71.5 | 182–183 |
| Heptyl resorcinol | 73–74.5 | 186–188 |

The present invention is directed to the new higher alkyl resorcinols as products without regard to the process used in making them.

This application is a continuation in part of my prior application, Serial No. 654,928 filed July 31, 1923.

Reference is made to my copending application Serial No. 225,833, filed October 12, 1927, which discloses alkyl resorcinols wherein the alkyl group contains eight or more carbon atoms. The new hexyl resorcinols are specifically claimed in my application Serial No. 225,832, and the heptyl resorcinols in my application Serial No. 680,726.

I claim:

1. New products comprising alkyl resorcinols containing more than four carbon atoms in the alkyl group, said compounds being definite and pure compounds in the form of white crystals possessing a high phenol co-efficient and possessing valuable therapeutic properties.

2. As new products, alkyl resorcinols having the general formula $C_6H_3(OH)_2R$, where R is an alkyl group containing more than four carbon atoms, said compounds possessing valuable therapeutic properties, and being in a pure state, crystalline solids.

3. New products comprising amyl resorcinols having the following formula, $$C_6H_3(OH)_2C_5H_{11}.$$

4. As new products pure amyl resorcinols having the following formula, $$C_6H_3(OH)_2C_5H_{11},$$

being crystalline compounds.

5. New product comprising normal amyl resorcinol having the following formula, $$C_6H_3(OH)_2CH_2-CH_2-CH_2-CH_2-CH_3.$$

6. As a new product pure normal amyl resorcinol having the following formula, $$C_6H_3(OH)_2CH_2.CH_2.CH_2.CH_2.CH_3,$$

being a crystalline substance having a melting point of 71.5° to 73° C. and boiling at 168° to 170° C. at 6 to 7 millimeters.

7. As new products, higher alkyl resorcinols, having an alkyl group which contains not less than five and not more than seven carbon atoms.

In testimony whereof I affix my signature.

ALFRED R. L. DOHME.